March 18, 1958     W. C. McKAY     2,827,412
MULTI-PLY PLASTIC LAMINATE AND METHOD OF FORMING SAME
Filed May 10, 1955     2 Sheets-Sheet 1

March 18, 1958 W. C. McKAY 2,827,412
MULTI-PLY PLASTIC LAMINATE AND METHOD OF FORMING SAME
Filed May 10, 1955 2 Sheets-Sheet 2

United States Patent Office 2,827,412
Patented Mar. 18, 1958

2,827,412

MULTI-PLY PLASTIC LAMINATE AND METHOD OF FORMING SAME

William C. McKay, Annandale, Va., assignor to W. R. Chance & Associates Inc., Arlington, Va.

Application May 10, 1955, Serial No. 507,213

6 Claims. (Cl. 154—116)

This invention relates to improvements in making laminates and is particularly directed to a process for forming a reinforced plastic laminate and to a novel overlapping joint in connecting build-ups or sections of a laminate.

It is the present practice in the art of making plastic laminates to build the laminate up one layer or ply at a time. This is accomplished by laying the first width or sheet of reinforcing material on a coated molding or forming surface, coating the outermost facing of the end edge of the sheet with an adhesive and then overlapping a contiguous sheet on the edge to form a continuation of the first sheet. The next contiguous sheet of the first layer or ply is overlapped onto the second sheet. In building up the laminate the second layer or ply is laid up on top of the first layer in the same continuous overlapping arrangement. The outermost facings of the first layer are coated with an adhesive and the sheets of the second layer are laid up thereon with their edges overlapped, and the overlapping joints between the sheets of one layer or ply are staggered with respect to the overlapped joints of previous and succeeding layers. The outermost faces of the layers must be completely coated as succeeding layers are built up thereon.

It is, therefore, necessary for the workmen to work against a surface that is always wet with bonding material, thus requiring them to exercise extreme care in maintaining the surface clean and making it difficult to lay up succeeding layers, due to such factor and the additional factors of precision requirements. With such orthodox build-up practices, it is extremely difficult to determine the thickness of the laminate as it is being built up and it is necessary to lay up the laminate one complete layer at a time so that the first ply or layer must be entirely laid up before the next layer or ply is laid thereon.

The present invention has for its primary objects to eliminate the necessity for the workmen to work against a surface that is always wet with bonding material, to render easier and more convenient applications of subsequent layers of materials and to enable a positive and easy determination of laminate thickness.

The present invention comprehends a stepped or "shingled" method of building up the multi-ply plastic laminate, which method generally involves the building up of a stepped primary build-up, which is composed of a number of plies that are offset from each other at a distance corresponding to the width of the required overlap, the primary build-up being of a thickness substantially corresponding to the thickness of the finished laminate. Such a primary build-up may be laid up in pyramidal form so that the opposing side edges of each subsequent ply are offset from the opposing side edges of each preceding ply by the width of the overlap of the reinforcing material or may be built up in semi-pyramidal stepped form, with only one side edge of each ply in stepped or offset relation with a side edge of the preceding plys or may be the result of a particular stepped finishing of the end of a preceding full build-up in contiguous build-up formations. The next step generally involved in the method is the laying up of the first width of reinforcing material, which is placed with one edge centered on top of the stepped primary build-up or on the semi-stepped primary build-up or on the stepped finishing edge of a preceding build-up and then laid down the side of the build-up and forced to conform to its stepped side configuration and then to the surface of the mold, on which the build-up has been laid. The next sheet of reinforcing material is laid on top of the first, progressing away from the primary build-up with the edge of the second sheet of the material removed from the edge of the first by a distance equal to that of the width of the offset between the plies of the primary build-up, that is, by a distance equal to that of the required lap. This is repeated with progressive sheets or widths of reinforcing material. The overlap distance is carefully controlled so that the thickness of the laminate remains constant. The section is thus entirely laid up on the form or mold, one width at a time, and the free end of the section is terminated in a stepped arrangement, similar to a semi-pyramidal shape, and provides the primary build-up for the next contiguous laminate section to be laid up on the form or mold; thereby providing a stepped overlapping joint between the sections.

Among the many advantages of the laminate lay-up method of the instant invention are the following:

(1) The laminate build-up to the desired thickness is completed as the lay-up progresses.

(2) Personnel doing the lay-up perform the work on the mold ahead of the lay-up in an area free from bonding material, thus ensuring a cleaner lay-up job, greater job efficiency and eliminating the need for scaffolding or stagging.

(3) Due to the maintenance of a constant overlap distance, the laminate thickness is controlled as required, thereby eliminating the necessity of discontinuing the work and counting the number of plies to determine the thickness.

(4) Quality control is increased due to the ease of the determination of laminate thickness, the increased cleanliness and the fact that the laminate is completed as it progresses in formation over the mold.

(5) Relatively inexperienced personnel may be used to perform the lay-up operation, due to the fact that all that is necessary to control the laminate thickness is to control the overlap distance.

(6) Primary bonds are obtained throughout the lay-up regardless of the thickness of the laminate.

(7) The overlapping contact area between adjacent layers of reinforcing materials is at a maximum.

(8) Room-cure bonding materials are readily used on large lay-ups, thus eliminating the need of heat to effect a cure of the bond.

The foregoing objects and advantages and ancillary objects and advantages are obtained by and result from this invention, the preferred embodiments of which are set forth in the following description and illustrated in the accompanying drawings wherein.

Figure 1:
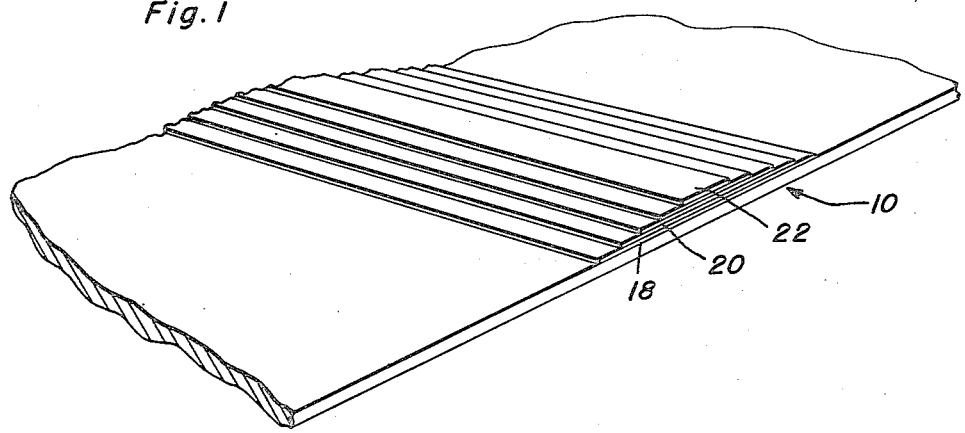
Fig. 1 is a fragmentary perspective view of the completed stepped or pyramidal primary build-up, formed on the mold or form, as the initial step in the process of lay-up of the multi-ply plastic laminate.
Figure 2:
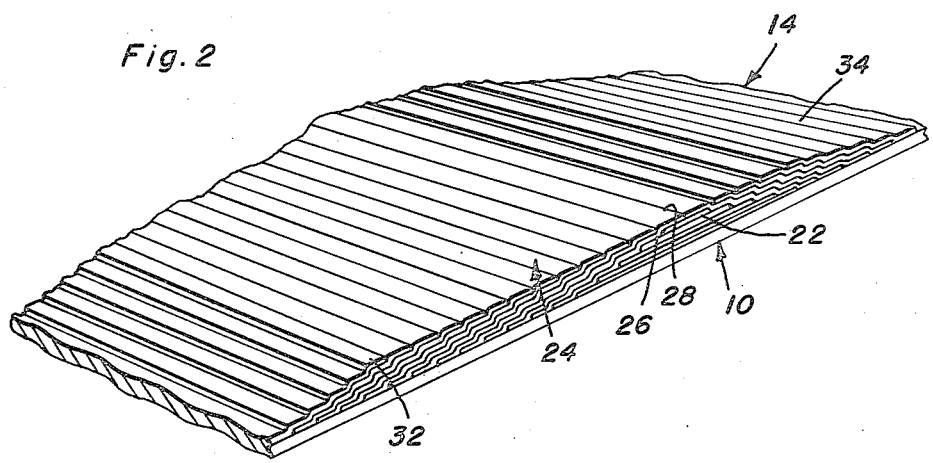
Fig. 2 is a fragmentary perspective view showing the plies or layers of reinforcing materials superimposed on the stepped pyramidal primary build-up and on the mold or form.
Figure 3:
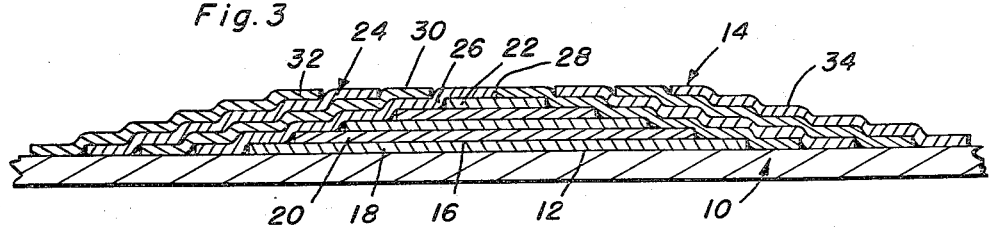
Fig. 3 is a transverse, vertical sectional view taken through the laminate.

Referring now more particularly to the accompanying drawings and initially to Figs. 1–3, the numeral 10 generally designates a form or mold, which may be of any desired shape, size, curvature or the like and which is merely shown for exemplary purposes, as being flat and having a flat outermost working face or surface 12.

The present process relates to a multi-ply lay-up of a reinforced plastic laminate 14, which is laid up or formed on the surface 12 of the mold or form 10. The plastic laminate is composed of a number of plies or layers of sheets of plastic reinforcing material, which sheets are very thin. The plies are shown in exaggerated size in the drawing for purposes of clarity and understanding of the invention.

Before performing the first step of the process it is necessary to determine the number of plies or layers of reinforcing material needed to produce the desired thickness of the laminate. This may be done in one way by dividing the thickness of the desired laminate by the thickness of one ply. Thus, one formula that may be used is the following:

$$\text{Number of plies} = \frac{\text{thickness of laminate }(T)}{\text{thickness of one ply }(t)}$$

Since by this process the thickness of the laminate is controlled by the width of the overlap between the plies or layers of the material, it is necessary to determine the required width of the overlap. This may be done by dividing the width of the reinforcing material by the number of plies, that is, $$\text{Width of lap} = \frac{\text{width of material }(W)}{\text{number of plies }(N)}$$

So that the following formula may be used in arriving at determinations:

$$W_{lap} = \frac{w \times t}{T}$$

The first step in one practice of the process is to build up or form a stepped pyramidal primary build-up, which, as shown in Fig. 1, may be formed at the center of the mold 10 or, as will be described, may be formed at one end of the mold in a semi-pyramidal stepped shape. The stepped primary build-up is formed from a number of plies 18 of reinforcing plastic material. It is to be particularly noted that the thickness of the primary build-up is equal to the thickness of the finished laminate less one ply and that the plies of the build-up are vertically offset at their opposing edges. The distance of the offset between the plies is equal to the width of the overlap, which may be determined as described in the foregoing. Thus, the width of the overlap, between subsequent layers or plies of the materials in building up the laminate, equals the width of the offset between the plies of the primary build-up 16. The stepped arrangement merely involves the initial laying of a bottom or inner ply 20 on the face of the mold and the bonding of a succeeding ply of diminishing width to the bottom ply, and a build-up of successive plies of diminishing widths until a final outer ply 22 is bonded on the underlying ply. The number of plies will depend on the desired thickness of the laminate.

The next step of this practice of the process involves the laying-up of the layers or plies 24, which constitute the first build-up leading from the primary build-up. The first sheet or width 26 of the reinforcing material is placed with its edge 28 centered on top of the core pyramidal build-up 16 and is laid on the top ply 22 thereof and laid down the side of the build-up 16 and forced to conform to its stepped shape and then laid on the surface of the mold. The surface of the ply 22 and the exposed surfaces of the inner plies and surface of the mold contiguous to the bottom ply 18 are first coated with a suitable bonding material, so that the ply 26 adheres to such surfaces. The next sheet or width 30 of reinforcing material is laid on top of the first, progressing away from the primary build-up 16 with the edge of the second sheet of material removed from the edge 28 of the first sheet by a distance equal to that of the required lap. This is repeated with progressive sheets of reinforcing material, as clearly shown in Fig. 3, until the laminate is laid up to the desired thickness.

The overlap distance is carefully controlled so that the thickness of the laminate remains constant. If the laminate extends to the end of the mold, the material is cut so that the lap distance remains constant and the laminate thickness is maintained.

Figure 5:
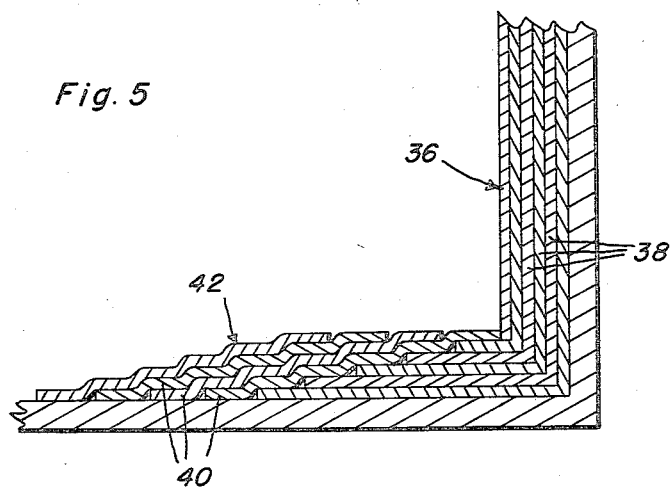
Fig. 5 is a transverse sectional view of the overlap joint between contiguous build-ups, which are arranged normal to each other, and, Fig. 6 is a transverse sectional view of the overlap joint between contiguous build-ups which are arranged on a curved mold to form a curved laminate.
Figure 6:
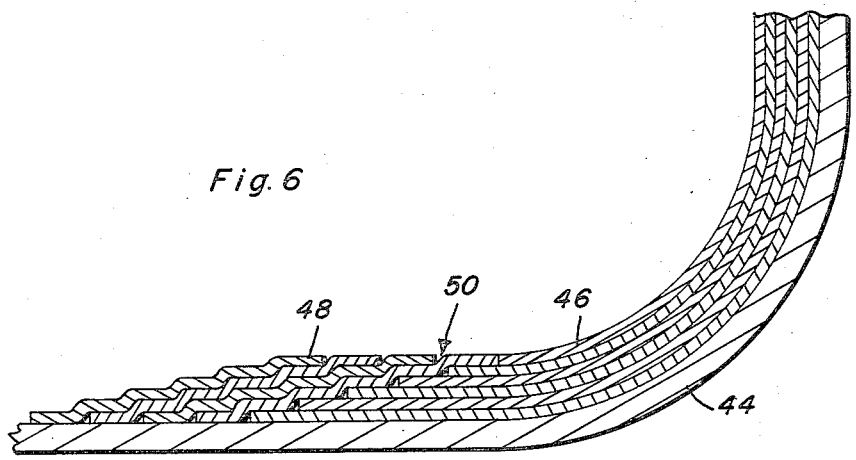

As shown in Figs. 2 and 3, the primary build-up 16 is so positioned on the mold or form that the build-ups or sections 32, aforedescribed and the build-ups 34 are laid down on the opposing stepped sides of the primary build-up and, due to the manner of laying-up the build-ups they terminate at their outer ends in semi-pyramidal or stepped shape. Such ends afford or provide starting points for the laying-up of succeeding, contiguous sections or build-ups thereby forming an overlapped, stepped joint between the build-ups, such as shown in Figs. 5 and 6. As illustrated in Fig. 5, the one build-up 36 has the ends of its plies 38 turned or disposed at right angles and terminating in the semi-pyramidal stepped arrangement. The plies or layers 40 of the contiguous build-up or section 42 are laid up on the stepped ends of the build-up 36 in the same manner as the build-ups 32 and 34 were laid up on the primary build-up 16. Thus, the stepped or shingled arrangement provides a maximum contact, overlapping joint between the contiguous sections or build-ups. Another example of such overlapping joint is illustrated in Fig. 6, wherein the mold or form 44 is curved and the build-ups or sections 46 and 48 follow the curvature of the mold with the overlapping joint 50 between the build-ups.

It is, of course, to be understood that the length, width and thickness of the build-ups or sections is immaterial and that the sheets or widths of reinforcing material which form the plies or layers of the build-ups or sections, are relatively thin. The showings of the stepped arrangements and stepped joints are exaggerated in size, in order to clearly illustrate the concept and practice of the invention.

Figure 4:
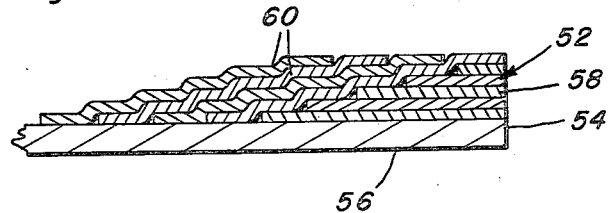
Fig. 4 is a transverse sectional view of a semi-pyramidal primary build-up.

In Fig. 4, the primary build-up 52 is shown as being laid up at the end 54 of a mold or form 56 and is illustrated as being semi-pyramidal in shape, that is, the layers or plies 58 thereof have their outer edges flush with the end edge of the mold and their inner end edges staggered to provide the stepped arrangement for laying up the sheets or width 60 of the reinforcing material.

It can thus be seen that the shingled or stepped arrangement, which involves an overlapping joint connection, wherein the overlap distance is controlled so that the thickness of the laminate remains constant, permits the workmen to work on the mold ahead of the lay up in an area free from bonding material. Also, it can be appreciated that the laminate thickness can be controlled as desired, by maintaining a constant overlap distance. Also, primary bonds are obtained throughout the lay-up as clearly illustrated in the drawings, regardless of the thickness of the laminate and the overlapping contact area between adjacent layers or plies of reinforcing materials is at a maximum.

The stepped arrangement generally comprises the steps of forming the end of one section or the primary build-up in a rearwardly stepped arrangement, that is, the sheets or plies of the one or the first section are arranged in a stepped arrangement inwardly from one end, the ends of the sheets being vertically offset inwardly from the bottom or innermost sheet to the top or outermost sheet. The second section or secondary build-up has the ends of its plies or sheets laid on the stepped arrangement in a manner so that the innermost or bottom sheet of the second section is laid on the stepped arrangement with its end abutting and being flush with the end of the outermost sheet of the first section and the ends of the other sheets are disposed coplanar therewith.

While the best known manner of practicing this invention and the best known forms of joint have been illustrated in the drawings and set forth in the foregoing description, it is to be understood that such are merely by way of example, since other ways of practicing the invention and other forms of overlapping joint may be realized, as coming within the scope of the invention as defined by the appended claims.

I claim:
1. The method of joining the contiguous ends of a pair of first and second plastic laminate sections, each section being composed of superimposed layers of thin flexible plastic sheet material, comprising the steps of terminating the end of the first section in a rearwardly stepped arrangement and laying up the layers of the second section on the stepped end with the innermost layer of the second section abutting and being flush with the outermost layer of the first section and with the successive layers of the second section having edge portions coplanar with the outermost layer of the first section.

2. The method of joining the contiguous ends of a pair of first and second plastic laminate sections, each section being composed of superimposed bonded layers of thin plastic sheet material, comprising the steps of terminating the end of the first of the sections in a rearwardly stepped arrangement of equal progression, and laying up the ends of the layers of the second section on said stepped end with the innermost layer of the second section abutting and being flush with the outermost layer of the first section and with the successive layers of the second section having ends coplanar with the outermost layer of the first section and spaced apart a distance equal to the spacing of the steps in the stepped end.

3. The method of joining the contiguous ends of a pair of first and second laminate sections, each section being composed of superimposed bonded layers of thin flexible sheet material, comprising the steps of arranging the ends of the layers of the first section in an equally progressive stepped arrangement, laying up the innermost layer of the second section on the stepped arrangement with the end thereof abutting and being flush with the end of the outermost layer of the first section and forcing the innermost layer over the stepped arrangement and bonding it thereto, and bonding successive layers on the innermost layer with the ends of such layers being coplanar with the outermost layer of the first section and being spaced apart a distance equal to the spacing of the stepped ends of the first section.

4. The method of building up a multi-ply plastic laminate comprising the steps of building up a primary build-up from superimposed sheets of thin plastic to a thickness substantially corresponding to the thickness of the finished laminate, forming an end of the primary build-up in an inwardly stepped arrangement by vertically offsetting the ends of the sheets inwardly from the innermost sheet to the outermost sheet, building up a secondary build-up from superimposed sheets of thin plastic by laying the ends of the sheets on the stepped arrangement with the ends of the sheets of the secondary build-up progressing away from the stepped end a distance equal to the offset between the ends of the sheets of the primary build-up.

5. The method of building up a multi-ply plastic laminate comprising the steps of building up a primary build-up from superimposed sheets of thin plastic to a thickness substantially corresponding to the thickness of the finished laminate, forming an end of the primary build-up in an inwardly stepped arrangement by vertically offsetting the ends of the sheets inwardly from the innermost sheet to the outermost sheet, building up a secondary build-up from superimposed sheets of thin plastic by laying the ends of the sheets on the stepped arrangement, with the innermost sheet being forced at one end portion to conform to the stepped arrangement and the subsequent sheets being laid one on top of the other over the innermost sheet, all of said sheets having outer ends disposed in coplanar relation and the ends being spaced apart a distance equal to the width of the offset between the sheets of the primary build-up.

6. A laminate build-up comprising a first section of superimposed plastic sheets having an inwardly stepped end defined by vertically inwardly offset ends on the sheets from the innermost sheet to the outermost sheet and a second section of superimposed plastic sheets, said sheets of the second section having ends laid up on the stepped end of the first section, said ends being in coplanar relation and being substantially coplanar with the outermost sheet of the first section and said ends being spaced apart a distance equal to the width of the offset between the sheets of the first section.

References Cited in the file of this patent
UNITED STATES PATENTS

| | | |
|---|---|---|
| 1,793,075 | Flowers | Feb. 17, 1931 |
| 2,406,697 | Lincoln | Aug. 7, 1946 |
| 2,493,032 | Rheinfrank | Jan. 3, 1950 |
| 2,550,520 | Bennett | Apr. 24, 1951 |
| 2,714,557 | Mahaffy | Aug. 2, 1955 |